United States Patent [19]

Linquist

[11] 4,375,128
[45] Mar. 1, 1983

[54] MANUAL KEYWAY PUNCHING TOOL

[75] Inventor: Wayne Linquist, Rockford, Ill.

[73] Assignee: Ex-Cell-O Corporation, Troy, Mich.

[21] Appl. No.: 253,965

[22] Filed: Apr. 13, 1981

Related U.S. Application Data

[63] Continuation of Ser. No. 59,868, Jul. 23, 1979, abandoned.

[51] Int. Cl.³ .............................................. B26B 13/00
[52] U.S. Cl. ........................................ 30/242; 30/184; 30/363
[58] Field of Search ................. 30/360, 184, 182, 183, 30/185, 242, 363

[56] References Cited

U.S. PATENT DOCUMENTS

| | | | |
|---|---|---|---|
| 974,553 | 11/1910 | Cloes | 30/242 |
| 1,061,661 | 5/1913 | Cloes | 30/242 |
| 1,475,273 | 11/1923 | Bernard | 30/184 |
| 2,329,387 | 9/1943 | Brenning | 30/242 |
| 2,856,686 | 10/1958 | Stanley | 30/242 |

Primary Examiner—Stephen G. Kunin
Assistant Examiner—J. T. Zatarga
Attorney, Agent, or Firm—Mitchell J. Hill; Edward J. Timmer

[57] ABSTRACT

This invention relates to a manually operated cutting tool for cutting notches or slits in metal, plastic and the like.

1 Claim, 10 Drawing Figures

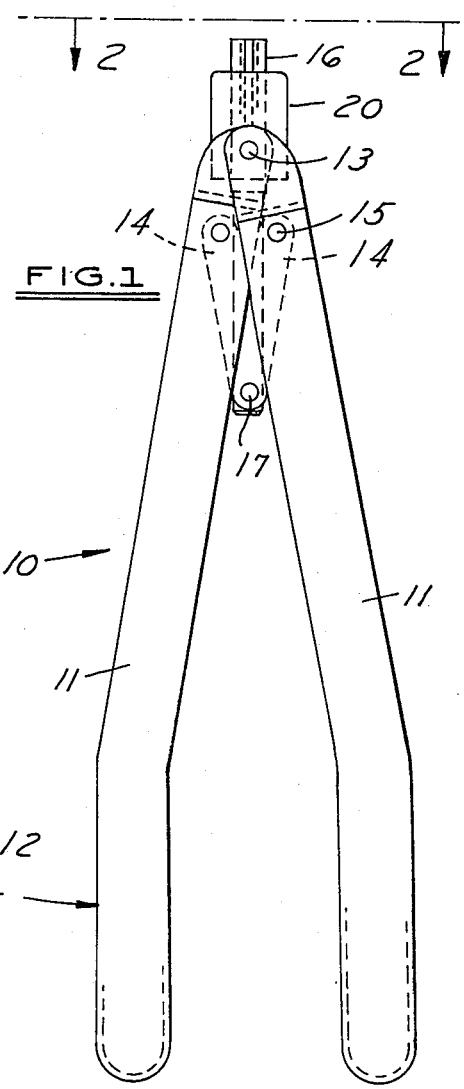
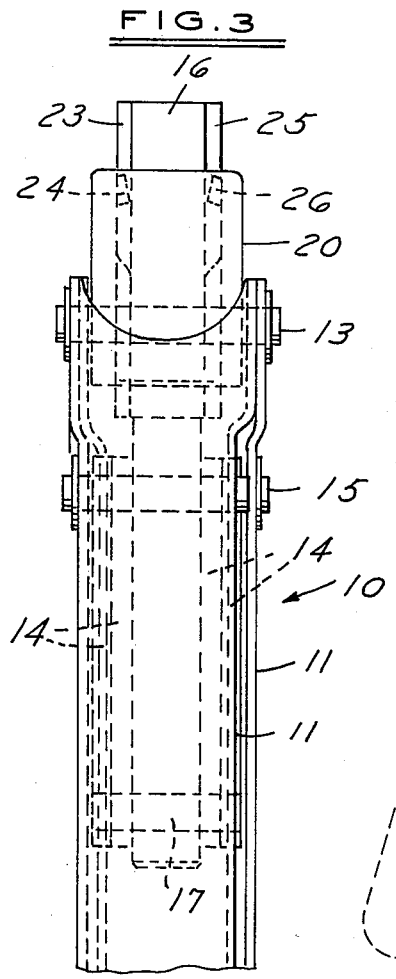
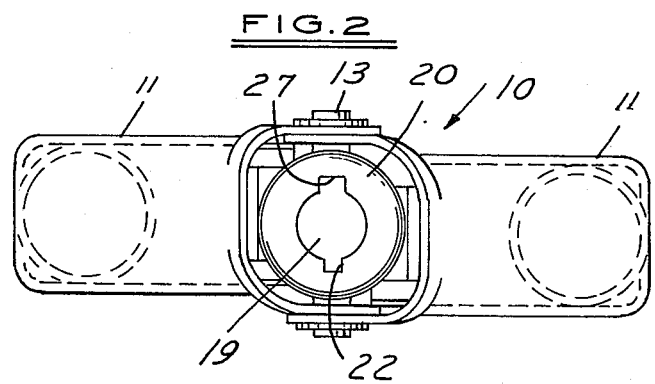

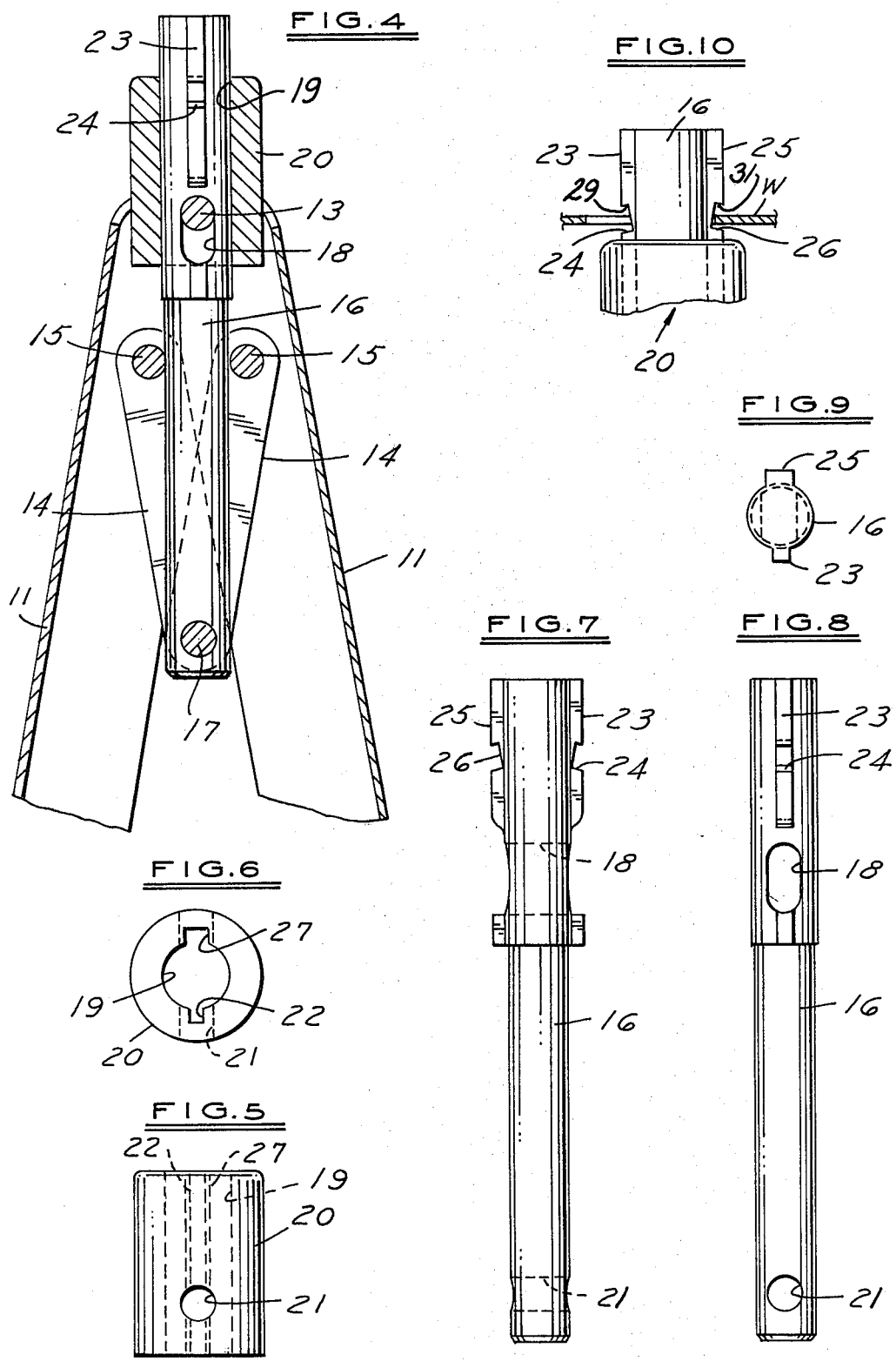

MANUAL KEYWAY PUNCHING TOOL

This is a continuation of application Ser. No. 59,868, filed July 23, 1979, now abandoned.

SUMMARY OF PRIOR ART

A slitting tool such as described in U.S. Pat. No. 3,263,545 shows a movable die that cuts a slot in metal, plastic, or the like. The patent shows that the force to move the die to cut the slit is on a direct or one-to-one ratio. Moreover, the tool shown in U.S. Pat. No. 4,111,022 shows a manual crimping tool utilizing two levers to move the jaws. However, applicant's invention is directed keyway punching tool.

SUMMARY OF THE INVENTION

The present invention is a manually operated tool for cutting uniform keyways in metal or non-ferrous material and its design provides for either a wider or narrower keyway.

BRIEF DESCRIPTION OF THE DRAWING

FIG. 1 is a side view of the tool;
FIG. 2 is a top view of the tool;
FIG. 3 is a fragmentary side view of the top of the tool;
FIG. 4 is a cross-sectional side view of the tool;
FIG. 5 is a view of the die;
FIG. 6 is a top view of the die shown in FIG. 6;
FIG. 7 is a side view of punch tool;
FIG. 8 is a front view of the punch tool shown in FIG. 7;
FIG. 9 is a top view of the punch tool shown in FIG. 8; and
FIG. 10 is a cross-sectional view of the punch and die showing the relative location of the recesses and the respective use thereof.

DETAILED DESCRIPTION

FIG. 1 shows a manually operated tool 10 comprising a pair of handles 11 adapted to be pivotally moved to position 12, shown in dotted line fashion, by means of a pivot pin 13. A plurality of linkages 14 is connected pivotally at one end of the linkages 14 to the punch 16 by means of a pivot pin 17. It is therefore apparent that pivotal movement of the handles outwardly at pivot pin 13 and pivotal movement of linkages 14 causes upward movement of the punch tool 16 by virtue of a recess 18, that provides for slidable movement of the punch 16 within the limits provided by the length of the recess 18. In other words, the slot 18 moves back and forth upon the pin 13 when the tool is in operation, the pin serving as an abutment to limit the movement of the punch 16.

A die 20 is located around the punch tool 16 and connected to the tool by means of pivot pin 13. That is, a longitudinal bore 19 in the die is aligned with the recess 18 of the punch 16 and connected to the handles 11 by means of a pivot pin 13. Movement of the handles 11 causes upward movement of the punch 16 whereas the die 20 remains stationary. The punch tool 16 comprises a bore 23 at one end to be pivotally connected to the linkages 14 by means of pivot pin 17. The upper end of punch tool 16 comprises two cutters 23 and 25 along the longitudinal axis thereof, that are diametrically opposite extensions of each other. That is, they are 180° apart. However, it is within the purview of one skilled in the arts to adapt the cutter extensions at different angular positions other than diametrically opposite each other. Each of the cutter extensions 23 and 25 are provided with a recess 24 and 26, respectively.

The die 20 comprises a bore 19 having longitudinal recesses 22 and 27 that are aligned with the protruding cutter extensions 23 and 25 of the punch 16.

It is apparent from FIG. 6 that the recesses 22 and 27 are a different size, but correspond to the size of cutter extensions 23 and 25. As shown in FIG. 10, a cross-sectional view of the material to be notched is brought up against the punch tool, and aligned in the recess 26. Movement of the handles 11 inwardly or toward each other causes downward movement of the punch 16 to the position shown in FIG. 4, and in so moving, the shoulder portion 31 of the cutter extension 25 causes the workpiece material to be notched.

In operation, the operator moves the handles 11 outwardly to move the cutters 23 and 25 above the die 20 and the tool is moved into position wherein the recess of either cutter 23 or 25 abuts the material to be removed. Thence, the operator closes or moves the handles toward each other causing the shoulder portion 29 or 31 of the cutter, either 23 or 25 respectively, to remove the metal between the top portion of die 20 and the shoulder portions 29 or 31 of either of the cutter extensions 23 or 25, respectively.

It is not intended that the invention be limited to the embodiments shown in the drawings, but rather that the invention also comprises all such designs and modifications as may come within the scope of the appended claims.

I claim:

1. A keyway cutting tool comprising a pair of elongated handles, pivot means connecting said handles together, linkage means including a pair of links, means pivotally connecting the links together at one end of their ends with the other of their ends being pivotally connected to a respective one of said handles, punch means having a pair of keyway cutter extensions extending longitudinally therealong adjacent one end and means adjacent the other end connecting the punch means to said link pivot means so that said punch means can be moved by bringing the handles toward or away from one another, said cutter extensions each having a recessed portion intermediate its longitudinal length with a cutting edge formed thereon adjacent said recess and being of different size to cut different size keyways, die means connected to said handle pivot means in stationary relation relative to said punch means, said die means having a bore for slidably receiving said punch means with said keyway cutter extensions extending out of said bore at the end of said die means remote from said handle pivot means when said handles are open and said die means having a surface on said remote end thereof for engaging and maintaining a workpiece thereon during cutting, said bore having a pair of different size recesses extending longitudinally therealong for receiving said longitudinally extending keyway cutter extensions when said handles are closed to move said punch means into said die means and cut the workpiece, and stop means disposed between said punch means and die means for controlling the extent of movement of said punch means relative to said die means when said handles are opened and closed.

* * * * *